Figure 1:
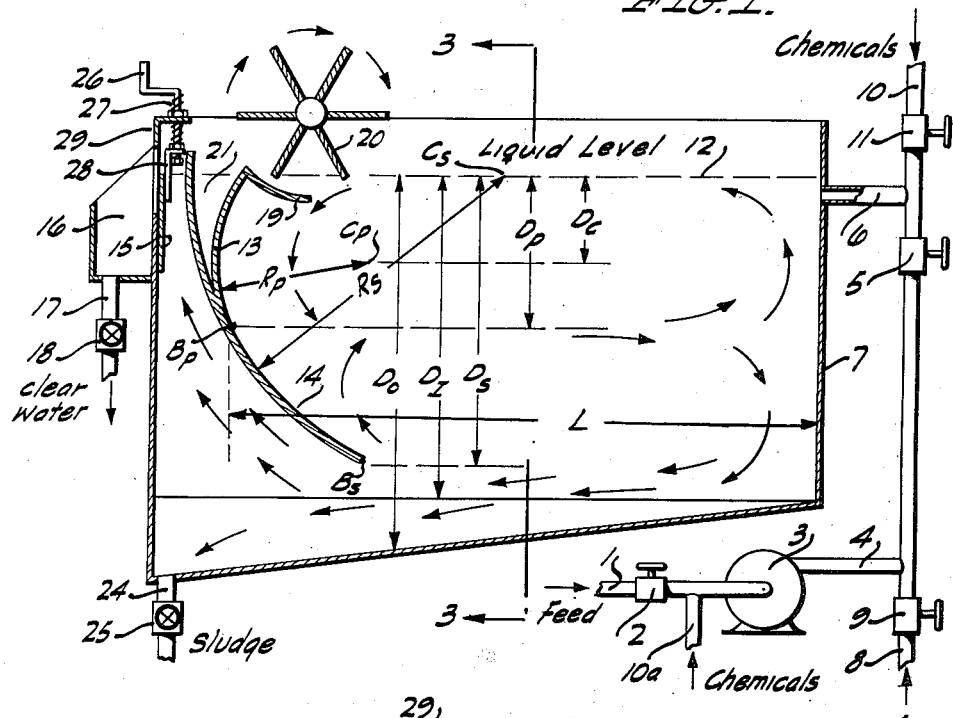

INVENTORS.
THOMAS F. G. BOYD,
PAUL W. FISCHER,
ROBERT T. WHEELER,
BY Milton W. Lee
ATTORNEY.

United States Patent Office 2,759,607
Patented Aug. 21, 1956

2,759,607

FLOTATION OF HYDROCARBON IMPURITIES

Thomas F. G. Boyd, Coalinga, and Paul W. Fischer and Robert T. Wheeler, Whittier, Calif., assignors to Union Oil Company of California, Los Angeles, Calif., a corporation of California Application February 27, 1951, Serial No. 212,985

8 Claims. (Cl. 210—53)

This invention relates to a method for purification of aqueous suspensions and emulsions, and particularly to chemicals and flotation equipment for the purpose.

Water which is contaminated with oil and/or solid material is frequently met in industry. For example, water produced with petroleum or used in the drilling or production of oil wells is generally contaminated with oil as well as some solids, and is frequently in the form of a water external emulsion which is very difficult to break. Emulsions and suspensions also occur in waste water from fish canning, fruit drying and various other processes, pump packings, leaks, engine coolants, etc. In oil field practice for example, waste water from various sources, which may be contaminated with oil, is generally sent to a separating tank and frequently thereafter to a skimming pond where it is allowed to settle. The oil is skimmed off and utilized and the purified water is then used for secondary recovery purposes or sent to the usual disposal, such as sewage lines. It is often the case however that the suspensions and/or emulsions which are formed cannot be broken simply by settling, and that the water so recovered, even though apparently clear, still contains as much as 200 or 300 parts per million of oil, emulsified or simply distributed through the water. It may also have or develop an oil film or a turbidity, due to oil or solids. This means that the water cannot be dropped to sewage disposal, since there are generally maximum limits imposed by the government on the oil and/or solids content of water entering sewer lines. The utilization of the water for other purposes, such as for injection into wells for secondary recovery of oil by water drive, is also seriously impaired by the presence of appreciable amounts of oil and/or solid material, since these may tend to plug the formation.

It is an object of this invention to provide a method and an apparatus for separating suspensions or emulsions which are difficult to separate by other processes such as simple settling.

It is a further object of this invention to separate solid material and/or oil from water which is contaminated with relatively small amounts of these materials.

It is a further object of this invention to provide a flotation apparatus for separating oil and/or solids from water.

It is a further object of this invention to provide a method for treating emulsions or suspensions with chemicals to facilitate their separation in flotation processes.

It is a further object of this invention to purify oil field waste water to make it suitable for disposal in sewers or the like, or for use in secondary recovery by water drive.

Further objects of the invenion will be apparent from the following description of the invention.

According to the present invention, emulsions or suspensions of oil and/or solids and water are thoroughly mixed with air or other flotation gas, preferably at a somewhat elevated pressure. The resulting emulsion containing entrained and dissolved gas is discharged horizontally through pressure reducing means if necessary into one end of a flotation unit which is relatively narrow, tall, and long, at a point just below the level of the liquid therein, and at a relatively high rate. A specially designed baffle at the opposite end of the flotation unit serves to circulate the water back to the entrance end of the flotation unit at a lower level, where it is again circulated to the far end along the bottom of the tank and passes behind the baffle and out of the tank over a weir at the discharge end of the unit. The gas which was entrained and dissolved during the mixing operation is liberated continuously in the tank in the form of exceedingly small bubbles, which have been found to be extremely effective in the flotation. The oil and/or certain solids are floated by the bubbles and rise to the surface from which they are skimmed near the discharge end of the unit. The heavy solids if any, separate readily when the oil has been separated, and they fall to the bottom of the unit, and are withdrawn therefrom direcly.

Figures 2, 3, 4:
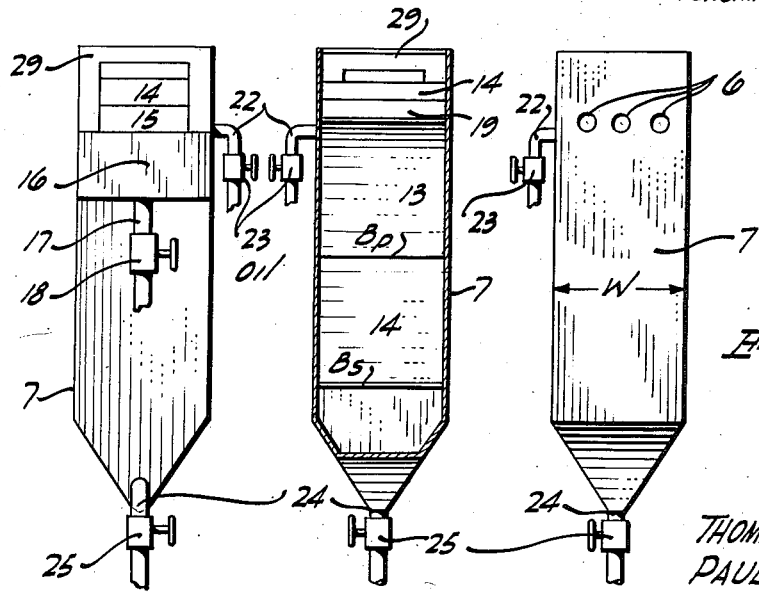

The design of the equipment will become more clear by reference to the attached drawings in which Figure 1 is a sectional side elevation of the flotation unit, Figure 2 is an end elevation of the discharge end of the unit, Figure 3 is a vertical section taken through 3—3 of Figure 1, and Figure 4 is an end elevation of the feed end of the unit. For greater clarity, the paddle wheel is omitted from Figures 2 to 4.

The same numbers are employed to designate the same parts of the equipment in all the drawings.

Referring to the drawings, the process will be described in connection with the purification of oil field waste water, which is an oil-in-water emulsion which also contains some suspended solids. Waste water feed enters line 1 at a high rate and passes through valve 2 into pump 3, where it is pressurized to a pressure of 40 to 50 pounds per square inch, and remains at substantially this pressure on its journey through line 4. On passing through valve 5, the pressure is reduced to substantially atmospheric pressure, and the water is passed through line 6 into flotation line 7. Air under higher pressure is introduced into line 4 through line 8 and valve 9 also at a relatively high rate. The air is preferably introduced close to the pump discharge, so that the waste water becomes very thoroughly contacted with air at the elevated pressure and great turbulence in this line. Chemicals may be introduced into the waste water feed either into line 1 through line 10a, or into line 6 through line 10 and valve 11. Line 6 is preferably split a its entry into cell 7 into a number of lines entering the unit at the same horizonal level and distributed uniformly across the width of the end. The same purpose may be accomplished by discharging the mixture through a horizontal slit in a pipe laid across the end of the cell.

Line 6 enters cell 7 just below the liquid level 12 maintained therein, and discharges horizontally, so that there is a current created at the surface from the inlet 6 to the baffles 13 and 14 at the far end of the unit. Baffles 13 and 14 are curved and concave toward the inlet of the tank, primary baffle 13 extending slightly above the liquid surface and down to about the mid-point of the tank, and secondary baffle 14 extending from a point well above the liquid surface to a point slightly above the bottom of the tank. Baffle 13 is of greater curvature than baffle 14, and the lower end of baffle 13 is attached to baffle 14 at about its midpoint. This creates a trough 21 between baffle 13 and the upper portion of baffle 14.

The water circulating back from baffles 13 and 14 finally passes under the lower end of baffle 14 and back of baffle 14 to the surface. It overflows over weir 15 into discharge box 16, from which it is removed through line 17 and valve 18. Meanwhile the oil and any light solids which may have been caused to float by the tiny air bubbles released from the incoming water by the pressure reduction are skimmed from the surface of the liquid in tank 7 by means of skimmer baffle 19 and paddles 20, which are rotated by means not shown. The oil is thus skimmed from the surface and passes into the trough 21 previously described, and is withdrawn therefrom through line 22 and valve 23. The solids which have settled from the water during the process are withdrawn from the lowest point of the cell 7 through line 24 and valve 25, in the form of a heavy aqueous sludge. Weir 15 is adjustable vertically by means of crank 26 and screw 27 which passes through frame 29 and is attached to the weir through bracket 28. The adjustment serves to control the liquid level 12 in the tank.

There are a number of features of the above apparatus which have been found to be critical. Thus the dimensions of tank 7 should be such that it is relatively narrow and long. For example, if $D_I$ designates the depth of the liquid from surface 12 down to the bottom of the tank at the inlet end thereof; and L designates the length of the tank as measured from the inlet end to the baffles 13 and 14, the width W should not exceed about 0.2 to about 0.7 times $D_I$ and should also not exceed about 0.1 to about 0.5 times L. The trough between baffle 13 and the upper portion of baffle 14 need only be large enough to accommodate the oil and foam skimmed off the surface of the tank, and the space behind baffle 14 need only be large enough to permit the clarified water to flow freely over the weir and out of the tank.

The point of feed inlet is quite important. It might be expected that introducing the feed at a considerable depth below the surface of the water in the tank would provide a longer path for the air bubbles and increase the efficiency of the flotation. However it has been found that it is preferable to introduce the feed at a point very close to the surface of the liquid. For example, the top of the inlet tube or tubes may be at the liquid level or immersed not more than about 0.2 times the depth of the tank at the inlet end thereof.

The primary baffle 13 should be placed so that its top extends slightly above the liquid level in the tank. Its bottom, i. e., where it joins baffle 14, should be located at a distance $D_P$ which is between about 0.3 and 0.7 times $D_I$ the depth of the liquid at the inlet end of the tank. The radius of curvature $R_P$ of this baffle should be between about 0.7 and 1.5 times $D_P$; and the center of the circle defining the radius of curvature should be located below the liquid level at a distance $D_C$ which is between about 0.3 and 0.7 times $D_P$.

As to the position of the secondary baffle 14, the upper end extends above liquid level 12, the point at which it joins baffle 13 is defined above as $D_P$, and the distance of its bottom below the liquid level, $D_S$ should be between about 0.6 and 0.95 times $D_O$, the depth of the liquid at the location of the bottom of baffle 14. The radius of curvature $R_S$ of the secondary baffle should be greater than that of the primary baffle in general and should be between about 0.7 and 1.5 times $D_I$ the depth of the liquid at the inlet end of the tank. The center of the circle defining the radius of curvature should be located at approximately the liquid level, or at a distance $D_C$ which is either above or below the liquid level not more than about 0.2 times $D_I$. Although a curved shape for baffle 14 is preferred, it may be straight or angular, providing that the lower portion of the baffle below its inersection with baffle 13 extends downward and toward the inlet end of the tank at an angle between about 30° and 60° from the vertical.

By following the above specifications, a tank of superior operating characteristics is produced. The length of the tank provides greater distance for flotation to occur, and the depth of the tank, the location of the feed inlet and the location and design of the two baffles substantially triples the path of the fluid in that the fluid is direced back upon itself at a point about midway in the depth of the tank, and is then again reversed to flow out below the bottom of baffle 14. This long path provides ample opportunity for flotation and settling to occur. The oil which is floated is carried to the point of skimming and concentrated there, and the solids which drop to the bottom of the tank are swept to the lowest point for removal there. The lowest point in the tank may be located if desired below the lower edge of baffle 14, or at any position behind the baffle as indicated.

As a specific example of a tank which is properly constructed, a flotation tank was built having a width W of about 2 feet, a liquid depth $D_I$ at the inlet end of about 5 feet, (note that the tank was constructed with an adjustable weir 15 which permitted the control of the liquid level over a range of about 6 inches), and a length L, to the point of intersection of baffles 13 and 14, of about 9 feet. The top of the feed inlet was not more than 3 inches below the liquid level, the top of the primary baffle extended about 3 inches above liquid level, the bottom of the baffle 13, where it joined baffle 14 was about 2.5 feet below the liquid level, the radius of curvature of baffle 13 was also about 2.5 feet, and the center line of this radius of curvature was about 1.25 feet below the liquid level. The bottom of the secondary baffle 14 was located at a depth of about 4.5 feet from the liquid level, which was approximately 0.75 times the depth of the liquid at this point. The radius of curvature of baffle 14 was about 5 feet, and its center line was located at the liquid level. This made the average slope of the lower portion of the baffle 14 about 45° from the vertical. Thus W equaled 0.4 $D_I$ or 0.2 L, $D_P$ equaled 0.5 $D_I$, $D_C$ equaled 0.5 $D_P$, and $R_P$ equaled 1.0 $D_P$. Similarly $D_S$ equaled about 0.75 $D_O$, and $R_S$ equaled about 1.0 $D_I$.

The above flotation unit was employed in a flotation operation as follows. The waste water feed to the unit was a brine which had originally been produced together with heavy crude California petroleum, and had been separated from the petroleum in a dehydrator and allowed to stratify for further separation in a tank and also in a skimming pond. The material still contained about 100 parts per million of oil however, which could not be separated by a further skimming operation. The water also contained about 100 parts per million of suspended solids. This feed water was not obviously emulsified or particularly turbid, but was entirely unsuitable for disposal into a sewage system, since the permissible limits on such sewage were less than 25 parts per million. This feed was pumped through the above flotation unit at a rate of about 5000 barrels per day. Since the effective volume of the tank ($L \times W \times D_I$ above) was 90 cubic feet or 16 barrels, this rate is equivalent to about 310 volumes per volume per day, or 13 volumes per volume per hour, or a residence time of less than 5 minutes. A centrifugal pump was employed to raise the pressure on the feed to about 40 to 45 pounds per square inch gauge, and air was forced into the pressurized water from a source having a pressure of about 75 pounds per square inch gauge, at a rate of about 2.5 standard cubic feet of air per barrel of feed water and at a point within about 2 feet of the pump discharge. The resulting aerated water was discharged through a valve near the inlet of the above flotation cell, which was operated at atmospheric pressure. The air released by the reduction in pressure arose through the liquid in the form of very tiny bubbles which formed a foam about an inch deep along the entire surface of the liquid in the tank. This foam was skimmed from the surface continuously and sent to oil storage. A small amount of sludge was drained intermittently from the bottom of the tank, and the purified water withdrawn from the back of the baffle 14 was free of solids and had an oil content of only about 5 parts per million, well within the required limits.

For larger installations, it has been found preferable to employ a number of cells of approximately the above dimensions, rather than one single cell of correspondingly larger proportions. In one such installation 6 cells are being operated continuously side by side in essentially the same manner as above. In this case the feed water contained slightly more oil. In another operation, where it was desired for the purpose of avoiding corrosivity of the feed water, to avoid the use of air, natural gas was substituted for air in the above flotation. The flotation cell was enclosed in a gas-tight cover, and operated at a pressure slightly above atmospheric to avoid possible leakage of air into the equipment, and the gas escaping from the flotation cell was recompressed and recycled to the feed. It was found that excellent results were obtained, comparable to the use of air in the process. Other gases, such as nitrogen, hydrogen, and the like, may also be employed in the process. In other operations, reduced pressures (in line 4) of about 15 pounds gauge have also been found suitable, and in one instance, a pressure not over 5 pounds gauge was operable.

It has also been found that in some cases it is desirable to allow a coagulation period to follow the flotation before discharging the water. Thus if a skimming pond, a settling tank, a second flotation unit, or even a pipeline of sufficient size and length is interposed between the flotation cell discharge and the sewer or other disposal, further oil may agglomerate as a result of the flotation treatment and this will still further purify the product. This coagulation is usually promoted by moderate agitation, but not by violent stirring. A coagulation period of as little as one-quarter hour is usually sufficient, although longer periods obviously do no harm. The agglomerated oil may be filtered or skimmed from the so purified water.

In the above detailed description, no mention has been made of the use of chemicals in the process. It has been found however that there are waste waters and other oil-contaminated waters which are not efficiently purified simply by flotation as above described. This is particularly true of waters which contain tight oil emulsions and/or oil-wet solids or scales. These waters are also frequently unaffected by the conventional chemical treatment with oil dehydrating chemicals or flotation agents, followed by mere skimming operations; but where the above flotation method is employed in conjunction with certain additives, even the most difficult of these waters has been purified. Conventional flotation agents have been tried without success in many of these operations, but one type of chemical has been found to be particularly effective when employed in this process. This type of product is well exemplified by hydroxypolyoxyethylene sorbitan monolaurate. This is prepared by reacting sorbitol with one molecule of lauric acid and then reacting the resulting ester with ethylene oxide until the free hydroxyl groups are all converted to hydroxypolyethylene groups. It is a commercially available additive being sold under the trade name "Tween 20" and has been found to be exceptionally effective in the above flotation process. The chemical may be added either just before pressurizing the feed water, as through line 10a in the drawing, or just after depressurizing the water entering the tank, as through line 10 of the drawing. The additive is water-soluble, and is preferably employed in aqueous solution, in amounts between about 1 and 300 parts per million and preferably between about 10 and 100 parts per million of the additive.

In a specific example, about 42 parts per million of the above material was added to a feed water containing about 150 parts per million of oil, and the resulting material was subjected to flotation in the above apparatus and process. The product contained only about 10 parts per million of oil, although without the addition of this chemical, under the same conditions of operation, a reduction in oil content only to about 60 parts per million was obtained. Although the above additive is preferred, other members of the same class of materials have been found very effective. Thus, suitable materials are hydroxypolyoxyethylene-substituted partial esters of polyhydric alcohols and fatty acids. They are prepared by partially esterifying and dehydrating polyhydric alcohols such as sorbitol, mannitol, iditol and dulcitol with fatty acids of more than about 10 carbon atoms, such as oleic, linoleic and ricinoleic and reacting the resulting esters which still contain at least two hydroxyl groups with ethylene oxide until the free hydroxyl groups are all converted to hydroxypolyoxyethylene groups and between about 10 and 30 of the oxyethylene groups are present. The method of preparation of these materials is shown fully in U. S. Patent 2,380,166 where they are referred to as type B emulsifiers. The sorbitan and mannitan products are sold under the trade name "Tween." The preferred polyhydric alcohols are the hexatol alcohols such as those listed above, and particularly the sorbitol, although other polyhydric alcohols such as pentatols and tetrahydric alcohols including pentaerythritol, erythritol and xylitol may be used. These are partially esterified with fatty acids having between about 10 and 17 carbon atoms to produce the esters which are subsequently converted to the hydroxypolyoxyethylene products. Specific examples of such products are polyoxyethylene mannitan monooleate, polyoxyethylene pentaerythritol monoricinoleate, polyoxyethylene sorbitan monopalmitate, and polyoxyethylene sorbitan monooleate.

Although the above are the preferred additives, and are generally more effective in the process of this invention, we may also employ materials prepared as above except that the esters are reacted with halogenated sulfonic acids, chloro acetic acid and similar monohalogenated sulfonic and carboxylic acids, in place of the ethylene oxide, so as to liberate the hydrogen halide and obtain sulfonic acid or carboxylic acid groups in place of the hydroxypoly-oxyethylene groups. These acids are then neutralized with an alakali to produce alkali salts of these acids, such as the sodium, potassium or ammonium salts. In these derivatives, the acids with which the esters are reacted may be represented by $XRSO_3H$ and $XRCOOH$ where X represents halogen, and R represents a hydrocarbon group having about 1 to 8 carbon atoms such as methylene, ethylene or phenylene or the like. Specific suitable compounds are (1) the sodium salt of the reaction product of mannitan monooleate and 5 moles of monochlor benzene sulfonic acid, (2) the ammonium salt of the reaction product sorbitan monolaurate and 5 moles of monochloracetic acid and (3) the sodium salt of the reaction product of sorbitan monopalmitate and 5 moles of monochloropropionic acid. These materials may be classed as the alkali sulfonate-substituted partial esters of polyhydric alcohols and fatty acids, and the alkali carboxylate-substituted partial esters of polyhydric alcohols and fatty acids.

Although the apparatus and process have been described rather specifically above, there are many modifications which are within the scope of the invention. The feed water, although generally containing less than 1% oil, may contain more oil, providing that the product is not too viscous. For the proper application of flotation, the feed liquid must not be substantially more viscous than water itself. The amount of oil which can be tolerated in the feed will therefore depend to some extent on the character of the oil emulsified or entrained in the water, but in general the process is most suitable for aqueous feeds containing not more than about 1000 parts per million of oil. The oil may be a light distillate or a heavy residual oil or crude, or coal tar or shale product or the like. The water may be a brine containing substantial amounts of dissolved salts, since these do not interfere with the process. In fact, dissolved bicarbonates in amounts of about 1% or less are actually beneficial. The insoluble solids content of the feed liquid may be as high as 0.1% or higher.

The flotation gas is preferably air, particularly where the feed contains dissolved or suspended iron compounds, although as indicated above other gases such as natural gas, hydrogen, etc., may be employed. The rate of feed should preferably be between about 150 and about 325 volumes of water per volume of flotation tank ($W \times D_1 \times L$ above) per day, although lower rates and somewhat higher rates can often be used. The flotation gas rates are generally between about 0.1 and 10 cubic feet per barrel of water treated. The proper amount of flotation gas may be determined by inspection ordinarily, since the best results generally are obtained when the flotation gas does not evolve in large bubbles, but causes a fine foam to rise.

The pressure of the flotation operation is generally atmospheric, but higher or lower pressures may be employed by enclosing the tank, as indicated in the natural gas example given above. The pressure to which the water is raised during solution of the flotation gas is preferably between about 2 to 5 times the pressure of the flotation tank, so as to provide for appreciable solution of the gas and liberation in the tank. However, lower pressures are operable. If the tank is operated at atmospheric pressure for example (approximately 15 pounds per square inch absolute pressure) and air is employed as the flotation gas, the preferred pressure in line 4 lies between about 15 and 50 pounds per square inch gauge, although pressures from about 3 to about 100 pounds per square inch gauge would also be operable.

The temperature of operation is also generally about atmospheric, but not necessarily so, since temperatures of —120° F. to +120° F. have also been employed successfully.

It may be pointed out that the flotation apparatus and process described above may also be employed to carry out chemical reactions involving flotation. For example, where iron sulfide is to be converted to iron oxide, and the iron sulfide is in the form of a fine suspension of solid material in water, such a suspension may be employed as the feed liquid, and air may be employed as the flotation gas. The iron sulfide is then converted to iron oxide and free sulfur in the flotation operation, and the sulfur is floated to the top of the tank and skimmed off just as in the case of the oil.

Other modifications of this invention which would occur to one skilled in the art from the above description thereof, are to be included within the scope of the invention as defined in the following claims.

We claim:

1. A method for treating a feed liquid to separate hydrocarbon oil impurities from water which comprises subjecting said feed liquid to contact with a flotation gas in the presence of a chemical comprising a substituted partial ester of a polyhydric alcohol and a fatty acid, selected from the class consisting of the hydroxypolyoxyethylene-substituted partial esters of polyhydric alcohols and fatty acids, the alkali sulfonate-substituted partial esters of polyhydric alcohols and fatty acids, and the alkali carboxylate-substituted partial esters of polyhydric alcohols and fatty acids.

2. A method according to claim 1 in which the chemical comprises a hydroxypolyoxyethylene-substituted partial ester of a polyhydric alcohol and a fatty acid.

3. A method according to claim 1 in which the chemical comprises an alkali sulfonate-substituted partial ester of a polyhydric alcohol and a fatty acid.

4. A method according to claim 1 in which the chemical comprises an alkali carboxylate-substituted partial ester of a polyhydric alcohol and a fatty acid.

5. A method according to claim 2 in which the ester is hydroxypolyoxyethylene sorbitan monolaurate.

6. A method according to claim 3 in which the chemical comprises the sodium salt of the reaction product of mannitan monooleate and 5 moles of monochlor benzene sulfonic acid.

7. A method according to claim 2 in which the chemical comprises the ammonium salt of the reaction product sorbitan monolaurate and 5 moles of monochloracetic acid.

8. A method according to claim 4 in which the chemical comprises the sodium salt of the reaction product of sorbitan monopalmitate and 5 moles of monochlorpropionic acid.

References Cited in the file of this patent

UNITED STATES PATENTS

| | | |
|---|---|---|
| 579,581 | Holmes et al. | Mar. 30, 1897 |
| 1,116,903 | McClintock | Nov. 10, 1914 |
| 1,187,772 | Ohrn | June 20, 1916 |
| 1,192,569 | Schilling | July 25, 1916 |
| 1,201,934 | Callow | Oct. 17, 1916 |
| 1,505,944 | Broadbridge et al. | Aug. 26, 1924 |
| 1,600,762 | Hawley | Sept. 21, 1926 |
| 1,717,223 | Karlstram | June 11, 1929 |
| 1,943,180 | Karlstram | Jan. 8, 1934 |
| 1,958,325 | Veatch | May 8, 1934 |
| 2,220,574 | Little et al. | Nov. 5, 1940 |
| 2,222,728 | Tartaron | Nov. 26, 1940 |
| 2,278,107 | Jayne et al. | Mar. 31, 1942 |
| 2,289,996 | Ralston et al. | July 14, 1942 |
| 2,312,466 | Erickson et al. | Mar. 2, 1943 |
| 2,337,118 | Loutz | Dec. 21, 1943 |
| 2,380,166 | Griffin | July 10, 1945 |
| 2,446,655 | Lawrason | Aug. 10, 1948 |

FOREIGN PATENTS

| | | |
|---|---|---|
| 416,284 | Germany | July 22, 1925 |

OTHER REFERENCES

Antwerpen: "Surface Active Agents," Ind. Eng. Chem., pp. 126–30, vol. 35, Jan. 1943. (Copy in Sci. Library.)